(12) United States Patent
Riexinger

(10) Patent No.: US 10,689,051 B2
(45) Date of Patent: Jun. 23, 2020

(54) DYNAMICALLY BALANCING VEHICLE

(71) Applicants: Cornelia Maurer, Korb (DE); Armin Maurer, Korb (DE); Uwe Bernhard, Backnang (DE)

(72) Inventor: Ulrich Riexinger, Oberrot (DE)

(*) Notice: Subject to any disclaimer, the term of this patent is extended or adjusted under 35 U.S.C. 154(b) by 102 days.

(21) Appl. No.: 15/759,212

(22) PCT Filed: Sep. 6, 2016

(86) PCT No.: PCT/EP2016/070920
§ 371 (c)(1),
(2) Date: Mar. 10, 2018

(87) PCT Pub. No.: WO2017/042145
PCT Pub. Date: Mar. 16, 2017

(65) Prior Publication Data
US 2018/0265160 A1    Sep. 20, 2018

(30) Foreign Application Priority Data
Sep. 10, 2015  (DE) .................. 10 2015 217 327

(51) Int. Cl.
*B62K 11/00* (2006.01)
*B62K 11/02* (2006.01)
*B62K 21/00* (2006.01)
*B62J 1/28* (2006.01)

(52) U.S. Cl.
CPC ............ *B62K 11/007* (2016.11); *B62K 11/02* (2013.01); *B62K 21/00* (2013.01); *B62J 1/28* (2013.01)

(58) Field of Classification Search
CPC ................................................ B62K 11/007
See application file for complete search history.

(56) References Cited

U.S. PATENT DOCUMENTS

| | | |
|---|---|---|
| 8,201,653 B2 | 6/2012 | Strassman |
| 2008/0245594 A1 | 10/2008 | Ishii et al. |
| 2009/0115149 A1 | 5/2009 | Wallis et al. |
| 2010/0114468 A1 | 5/2010 | Field et al. |
| 2011/0204592 A1 | 8/2011 | Johansen et al. |

FOREIGN PATENT DOCUMENTS

| | | |
|---|---|---|
| DE | 102007061708 A1 | 6/2009 |
| WO | 2011/106767 A2 | 9/2011 |

OTHER PUBLICATIONS

German Search Report dated Jun. 24, 2016.
English abstract for DE-102007061708.

*Primary Examiner* — Tony H Winner
(74) *Attorney, Agent, or Firm* — Fishman Stewart PLLC

(57) ABSTRACT

A dynamically balancing vehicle is disclosed. The vehicle includes a chassis including a lower frame and an upper frame. A vehicle seat for an occupant is borne by the upper frame, and at least two wheels are mounted on the lower frame. A drive device is coupled to the wheels for dynamically balancing the vehicle and driving, braking and steering. A steering device generates steering commands and includes a steering rod mounted via a handlebar mount on the lower frame. A coupling device connects the upper frame to the steering rod and facilitates transmission of tensile and compressive forces in the vehicle longitudinal axis and permits relative movements between the steering rod and the upper frame in the vehicle transverse axis.

20 Claims, 3 Drawing Sheets

DYNAMICALLY BALANCING VEHICLE

CROSS-REFERENCE TO RELATED APPLICATION

This application claims priority to International Application No. PCT/EP2016/070920 filed on Sep. 6, 2016, and to German Application No. 10 2015 217 327.5 filed on Sep. 10, 2015, the contents of each of which are hereby incorporated by reference in their entirety.

TECHNICAL FIELD

The present invention relates to a dynamically balancing vehicle.

BACKGROUND

A dynamically balancing vehicle has a chassis, which is supported on an underlying surface via at least one wheel, a drive for driving the at least one wheel, an inclination sensor system and a control device. These vehicles are either used with only a single wheel or with a plurality of wheels, preferably with exactly two wheels, but which then rotate about a common wheel axis of rotation, which extends parallel to a vehicle transverse axis. The chassis typically has a tread surface, on which a vehicle driver can stand. The control device controls the respective drive in such a way that the vehicle is balanced. For this purpose, an angle of inclination of the vehicle longitudinal axis relative to a horizontal plane, which extends perpendicular to the gravitational direction, is determined among other things. The control device now attempts permanently to reset this angle of inclination to the value zero by correspondingly controlling the drive. The vehicle driver can now change the inclination of the chassis with respect to the horizontal plane by shifting the center of gravity of his body, whereby an acceleration or a deceleration of the vehicle occurs, depending on the angle of inclination.

In the case of such a vehicle, which has exactly two wheels, which rotate about a common wheel axis of rotation, provision is made for a separate drive for each wheel. Provision is further made for a steering device for generating steering commands. Depending on the steering command, the drives for the two wheels can be operated differently, thus resulting in a corresponding steering operation of the vehicle. Such a steering device can have, for example, a switch, by means of which the vehicle driver can generate the steering commands.

In the alternative, the steering device can have a steering rod, which can be operated by the vehicle driver and which is mounted so as to be pivotable about a steering axis, which runs parallel to a vehicle longitudinal axis via a handlebar mount on the chassis.

Such dynamically balancing vehicles have become known under the same "Segway" by the manufacturer Segway Incorporated.

A dynamically balancing vehicle of this type is known from WO 2011/106767 A2, but which is equipped with a vehicle seat, on which the vehicle driver can take a seat, instead of with a footboard comprising a tread surface for a standing vehicle driver. Due to the fact that the center of gravity is a great deal lower when a vehicle driver sits, a center of gravity shift has a significantly less marked impact on the angle of inclination of the vehicle. In addition, substantially only the upper body can be moved in the case of a sitting vehicle driver in order to change the center of gravity of the vehicle driver. The shift of the center of gravity and thus the impact on the angle of inclination in the case of such a dynamically balancing vehicle comprising a vehicle seat is thus significantly reduced. To find a remedy here, provision is made in the case of the known vehicle to attach the vehicle seat to the chassis so as to be adjustable in the vehicle longitudinal axis. The vehicle driver can thus shift his center of gravity significantly better, whereby the impact on the angle of inclination is intensified accordingly. As a result, the vehicle reacts with an increased dynamic. To now be able to move the vehicle seat relative to the chassis, the known vehicle is equipped with a lever arrangement, which comprises a main lever comprising handle and an additional lever. On its upper end, the main lever supports the handle and, on its lower end, is connected in an articulated manner to a foot board, which is fixedly attached to the chassis and which serves to position the feet of the sitting vehicle driver. The additional lever now uses the main lever between the ends thereof with the vehicle seat. By pulling and pushing on the handle, the vehicle driver can shift forwards or backwards, respectively, together with the vehicle seat, which is associated with a corresponding center of gravity shift. All of the forces, which the vehicle driver introduces into the main lever, are hereby absorbed by the mounting on the foot board, whereby the latter is exposed to particularly large loads.

The present invention deals with the problem of specifying an improved embodiment, which is in particular characterized by a reduced load on the handlebar mount, for a dynamically balancing vehicle, which is equipped with a vehicle seat and with a steering rod.

According to the invention, this problem is solved by means of the subject matter of the independent claims. Advantageous embodiments are the subject matter of the dependent claims.

The invention is based on the general idea of supporting the steering rod on the chassis with the help of a coupling device, so that this coupling device absorbs a significant portion of the tensile and compressive forces, which are introduced into the steering rod by the vehicle driver, which leads to a significant relieving of the handlebar mount. In addition, it is proposed according to the invention to equip the chassis with a lower frame, and an upper frame, which is fixedly connected to said lower frame, which are arranged above one another in relation to a vehicle vertical axis. While the handlebar mount is arranged on the lower frame, the coupling device is connected to the upper frame. The lever forces, which are transmitted to the handlebar mount via the steering rod and which are created in response to introducing the tensile and compressive forces into the steering rod, are significantly reduced through this, because the effective lever arms are decreased. In detail, the coupling device is embodied and arranged in such a way that it connects the upper frame to the steering rod for the purpose of pressure and compressive force transmission in the vehicle longitudinal axis and thereby allows relative movements between the steering rod and the upper frame in the vehicle transverse axis. The coupling device thus creates a connection between the steering rod and the upper frame, which is stiff or rigid in the vehicle longitudinal axis, while relative movements are possible in the vehicle transverse axis, to be able to continue pivoting the steering rod about its steering axis.

As in the above-mentioned WO 2011/106767 A2, the vehicle seat can now be adjusted relative to the chassis in the vehicle longitudinal direction. For this purpose, the vehicle seat is then attached to the upper frame so as to be adjustable in the vehicle longitudinal direction. In the alternative, however, the vehicle seat can also be fixedly connected to the upper frame.

According to an advantageous embodiment, the coupling device can have a stationary area and a mobile area, which are coupled to one another for transmission of tensile and compressive forces. Advantageously, the stationary area can thereby be fastened to the upper frame, while the mobile area is fastened to the steering rod and can pivot with the steering rod about the steering axis and can thereby move relative to the upper frame in the vehicle transverse axis. This results in a particularly simple connection of the coupling device to the steering rod, without thereby creating the risk of an interference contour for the vehicle driver.

In another embodiment, the coupling device can have a guide rail, which is fastened to the upper frame, and at least one adjustable frame part, which is guided on the guide rail in the vehicle transverse axis and which is coupled to the guide rail for the tensile and compressive force transmission. Such a guide rail, which can in particular be considered to belong to the above-mentioned stationary area of the coupling device, is characterized by a simple setup with the highest stability. In its guide direction, the guide rail can further create a particularly low-friction guide for the respective frame part, while it provides for a particularly high force transmission in transverse direction thereto.

According to an advantageous further development, the frame part can have at least one carriage or can be fastened to at least one carriage. The respective carriage can now be mounted on the guide rail so as to be adjustable. Advantageously, such a carriage is designed complementary to the respective guide rail and can thus move with particularly little friction along the guide direction of the guide rail, while it allows for a high force transmission transversely to the guide direction. To reduce the risk of a canting of the carriage in response to the adjusting along the guide rail under load, the carriage can be dimensioned to be correspondingly large along the guide rail. Likewise, it is conceivable to attach two or more carriages next to one another on the guide rail, in order to effect a wider support. The frame part can in particular be fixedly connected to two carriages, which are preferably spaced apart from one another along the guide rail. In the alternative, the carriages can also directly abut against one another.

In another further development, the guide rail can have at least one guide contour, while the respective carriage has at least one guide mount, by means of which the carriage is mounted on at least one such guide contour so as to be adjustable. A particularly low-friction adjustability can be realized through this. At the same time, a low-play to play-free movability of the respective carriage along the guide rail can be realized as well.

In addition or in the alternative, the respective carriage can cooperate with the guide rail in such a way that it can be adjusted along the guide rail, while it is fixedly connected to the guide rail in transverse direction thereto. In particular the tensile and compressive forces, which are relevant here, can be transmitted between steering rod and upper frame via the fixed connection.

In another advantageous embodiment, the guide rail can be designed as straight, linear guide rail. The guide rail thus obtains a particularly simple and thus cost-efficient setup. In another embodiment, the guide rail can also be designed to be curved, preferably arcuately curved. The corresponding radius then advantageously corresponds to the distance of the guide rail to the steering rod.

In another advantageous embodiment, the coupling device can have a handlebar part, which is fastened to the steering rod, and a compensating joint, by means of which the handlebar part and the frame part are connected to one another in an articulated manner. The pivotability of the steering rod about its steering axis relative to the upper frame inside the coupling device can thus be ensured in a comparatively simple manner.

In a further development, the compensating joint can have a guide pin and a pin receiver, in which the guide pin is mounted so as to be adjustable in the vehicle vertical axis. The guide pin is preferably fastened to the handlebar part, while the pin receiver is fastened to the frame part. On principle, however, a reversed design is conceivable as well, in the case of which the guide pin is fastened to the frame part, while the pin receiver is fastened to the handlebar part. As a result of the adjustability of the guide pin in the pin receiver parallel to the vehicle vertical axis, relative movements occurring in the area of the coupling device can be compensated in the vertical axis. Such relative movements occur in the vertical axis in response to pivoting the steering rod about the steering axis.

According to another advantageous embodiment, the steering rod can be inserted into a rod receiver, which is arranged on the handlebar mount, so as to be removable in the vehicle vertical axis. For a simplified access to the vehicle seat, the steering rod can thus be removed, which simplifies the entering and leaving of the vehicle.

A further development is now particularly advantageous, in which, in connection with the insertable steering rod, the guide pin is fastened to the handlebar part. It can be attained through this that, when inserting the steering rod into the rod receiver, the guide pin can simultaneously also be inserted into the guide receiver. Advantageously, the guide pin is thereby inserted into the pin receiver from the top, so that the insertion direction of the guide pin and the insertion direction of the steering rod are identical.

In another advantageous embodiment, the compensating joint can have a mount, in the case of which a mounting body is mounted in a mounting housing so as to be pivotable about a mounting axis, which runs parallel to the vehicle longitudinal axis. The mounting body now forms the pin receiver or has the latter, while the mounting housing is fastened to the handlebar part or to the frame part. In response to pivoting the steering rod, the handlebar part changes its spatial position. This then also applies for the respective part of the compensating joint, thus either for the guide pin or for the pin receiver. In contrast, the spatial orientation in relation to the vertical axis remains unchanged in the case of the frame-side components. The compensating joint introduced here comprising mounting body and mounting housing can compensate this change of the spatial position.

Particularly advantageously, the mounting body can have a circular cylindrical or a spherical outer contour. The compensating joint thus has a particularly cost-efficient setup. The compensating joint can in particular be a flange bearing, which can be fastened particularly easily to the handlebar part or to the frame part.

The mounting pin advantageously has a circular cylindrical outer contour. The pin receiver can be an elongated hole, which is oriented in the vehicle transverse axis. However, an embodiment, in which the pin receiver has a circular cylindrical inner contour, into which the guide pin can be inserted in a quasi play-free manner, is preferred.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

In each case schematically,

DETAILED DESCRIPTION

Figure 1:
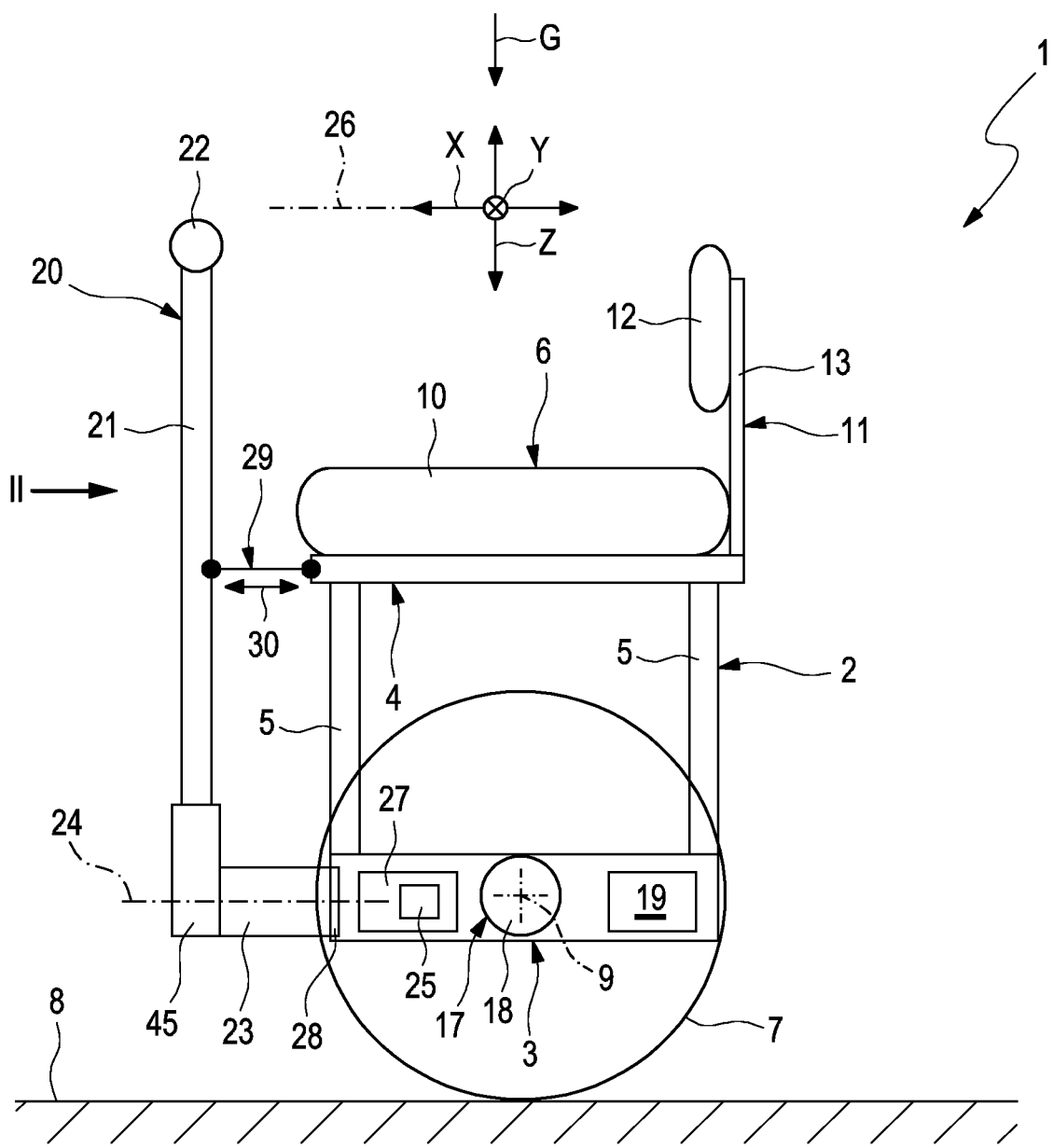
FIG. 1 shows a simplified side view of a dynamically balancing vehicle.
Figure 2:
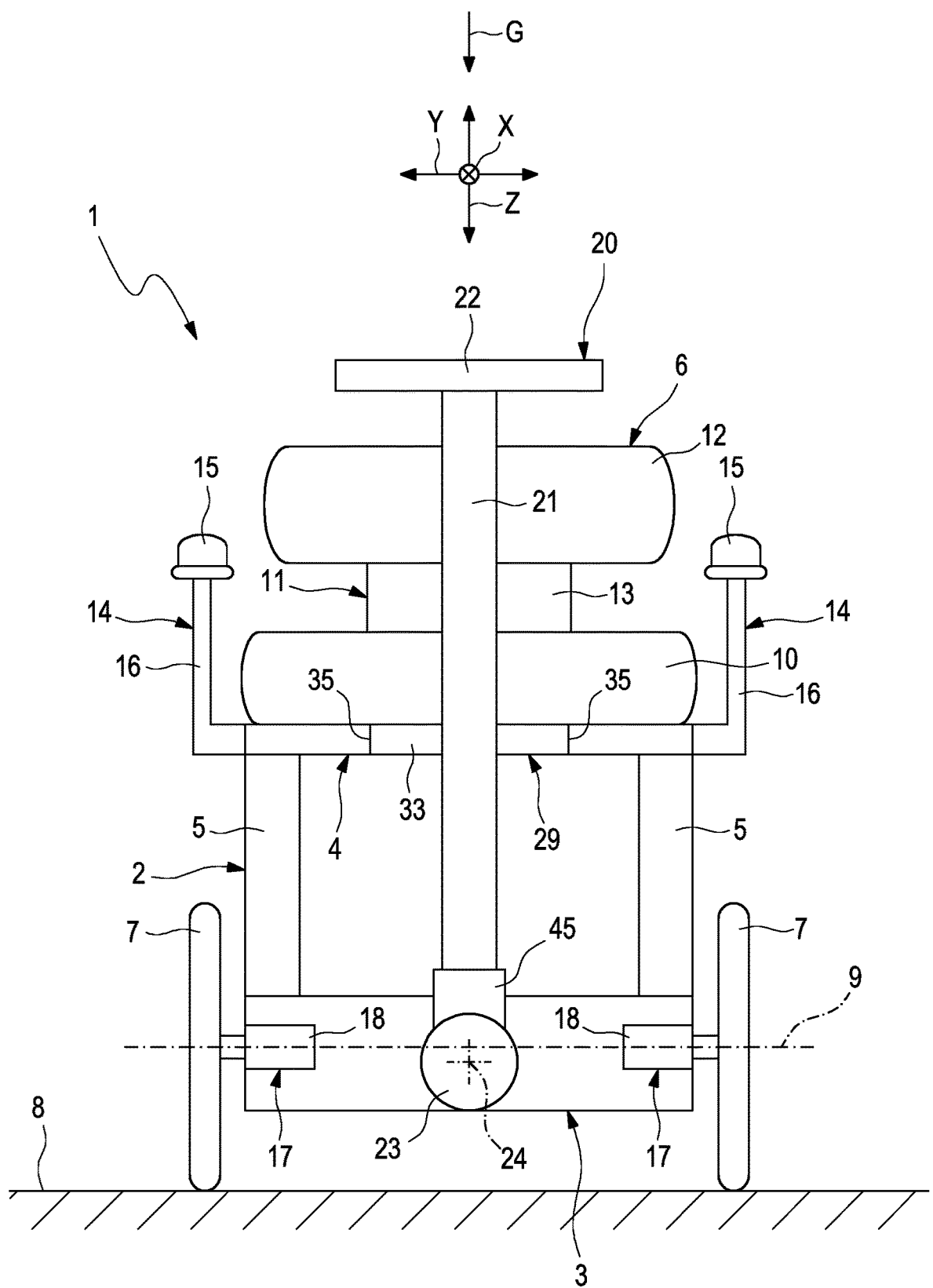
FIG. 2 shows a simplified front view of the vehicle according to a viewing direction II in FIG. 1.

According to FIGS. 1 and 2, a dynamically balancing vehicle 1 comprises a chassis 2, which has a lower frame 3 and an upper frame 4. Lower frame 3 and upper frame 4 are fixedly connected to one another, for example via a plurality of vertical mounts 5, which thus also belong to the construction volume of the chassis 2. The chassis 2 is characterized by a high stability and stiffness with comparatively small weight.

The vehicle 1 has a longitudinal axis X or longitudinal direction X, which runs horizontally in the use state of the vehicle 1. The vehicle 1 further has a transverse axis Y or transverse direction Y, which runs vertically to the vehicle longitudinal axis X and also horizontally in the use state of the vehicle 1. Finally, the vehicle 1 also has a vertical axis Z or vertical direction Z, which extends vertically to the vehicle longitudinal axis X and vertically to the vehicle transverse axis Y and which runs vertically in the use state of the vehicle 1.

In relation to the vehicle vertical axis Z, the upper frame 4 is arranged above the lower frame 3. The upper frame 4 serves to receive a vehicle seat 6 for a vehicle driver. The lower frame 3 serves to receive different components of the vehicle 1, which will be described below. To receive said components, the lower frame 3 is thereby preferably designed as trough or housing.

The vehicle 1 has at least two wheels 7, which serve to support the vehicle 1 on an underlying surface 8, on which the vehicle 1 stands or drives. In the shown example, the vehicle 1 has exactly two wheels 7 to support the bottom frame 3 on the underlying surface 8. Theoretically, three or more wheels 7 are also conceivable. It is essential that the wheels 7 are arranged on the chassis 2 so as to be rotatable about a common wheel axis of rotation 9, which runs parallel to the vehicle transverse axis Y. In the shown example, the wheels 7 are rotatably mounted on the bottom frame 3, namely on two sides of the bottom frame 3, which face away from one another in the vehicle transverse axis Y.

The above-mentioned vehicle seat 6 comprises a seat cushion 10, which is borne by the upper frame 4. In the simplest case, the seat cushion 10 is fixedly connected to the upper frame 4. In another embodiment, which is not shown here, the seat cushion 10, in contrast, can be arranged so as to be adjustable relative to the upper frame 4 in the vehicle longitudinal axis X. The vehicle seat 6 also has a backrest 11, which has a backrest cushion 12 and a backrest cushion holder 13, by means of which the backrest cushion 12 is fastened to the upper frame 4. In addition, provision can be made for two arm rests 14, which are depicted in FIG. 2, which in each case have an armrest cushion 15 and an armrest cushion holder 16, which fixedly connects the armrest cushion 15 to the upper frame 4. For the sake of clarity, these armrests 14 have been omitted in FIG. 1. At least one of these armrests 14 can be configured to be capable of being folded down about a pivot axis, which runs parallel to the vehicle longitudinal axis X.

The vehicle 1 further comprises a drive device 17, which is coupled to the wheels 7 and which serves to dynamically balance the vehicle 1 as well as to drive, to brake and to steer the vehicle 1. Advantageously, the drive device 17 comprises an electric motor 18 for each of the two wheels 7 as well as at least one battery 19 as electrical energy storage device or to supply power to the motors 18, respectively. If provision is made for more than three wheels 7, the drive device 17 is coupled to at least two of these wheels 7. At least two wheels 7 are then also equipped with one electric motor 18 each.

The vehicle 1 further has a steering device 20, which is provided to generate steering commands. For this purpose, the steering device 20 has a steering rod 21, which can be operated by the vehicle driver. On its upper end, the steering rod 21 is advantageously equipped with a handle 22 for this purpose, on which the vehicle driver can seize and operate the steering rod 21. On its lower end, the steering rod 21 is mounted via the handlebar mount 23 on the bottom frame 3 so as to be pivotable about a pivot axis 24, which extends parallel to the vehicle longitudinal axis X.

The vehicle 1 is also equipped with an inclination sensor system 25, which is only suggested in FIG. 1 and which serves to determine an angle of inclination. Said angle of inclination is spanned between the vehicle longitudinal axis X and a horizontal plane 26, which is suggested in FIG. 1, which extends vertically to the gravitational direction G, which is suggested by an arrow in FIGS. 1 and 2. The gravitational direction G points to the earth's center. Provision is furthermore made for a control device 27, which is also suggested only in FIG. 1 and which is coupled to the steering device 20 and to the inclination sensor system 25 in a suitable manner. In the example, the inclination sensor system 25 is integrated into the control device 27. In particular on the handlebar mount 23, the steering device 20 can have a steering angle sensor system 28 to detect a steering angle. The steering angle is thereby that angle, which the steering rod 21 spans with respect to a vertical direction. In the shown example of FIG. 2, the steering rod 21 stands vertically, so that the steering angle has the value 0°. In the shown example of FIG. 1, the vehicle 1 or the frame 2 thereof, respectively, is oriented horizontally, so that the vehicle longitudinal axis X extends in the horizontal plane 26 and the angle of inclination has the value 0°.

The control device 27 serves to generate drive commands and brake commands as a function of the angle of inclination. The control device 27 is further designed in such a way that it can control the drive device 17 or the electric motor 18 thereof, respectively, as a function of the steering commands, as a function of the drive commands, and as a function of the brake commands.

The vehicle 1 is furthermore equipped with a coupling device 29, which is only suggested symbolically in FIGS. 1 and 2. The coupling device 29 connects the upper frame 4 to the steering rod 21 in such a way that the coupling device 29 can transmit tensile and compressive forces in the vehicle longitudinal direction X. A corresponding tensile and compressive force transmission is suggested in FIG. 1 by means of a double arrow 30. The coupling device 29 is further designed in such a way that it allows for relative movements between the steering rod 21 and the upper frame 4 in the vehicle transverse axis Y. These relative movements result in response to a pivoting of the steering rod 21 about the steering axis 24, thus in response to steering the vehicle 1. With the help of the coupling device 29, the vehicle driver can pull himself forwards on the handle 22, in order to shift his center of gravity to the front, or can push backwards, in order to shift his center of gravity to the back. Depending on the dynamic, with which the vehicle driver carries out these maneuvers, more or less large tensile or compressive forces are introduced into the steering rod 21 via the handle 22. These tensile and compressive forces are supported on the upper frame 4 via the coupling device 29, whereby the handlebar mount 23 is significantly relieved. In particular, high bending moments in the handlebar mount 23 about a horizontal axis, which runs through the handlebar mount 23, can largely be avoided. The handlebar mount 23 is protected through this.

Figure 3:
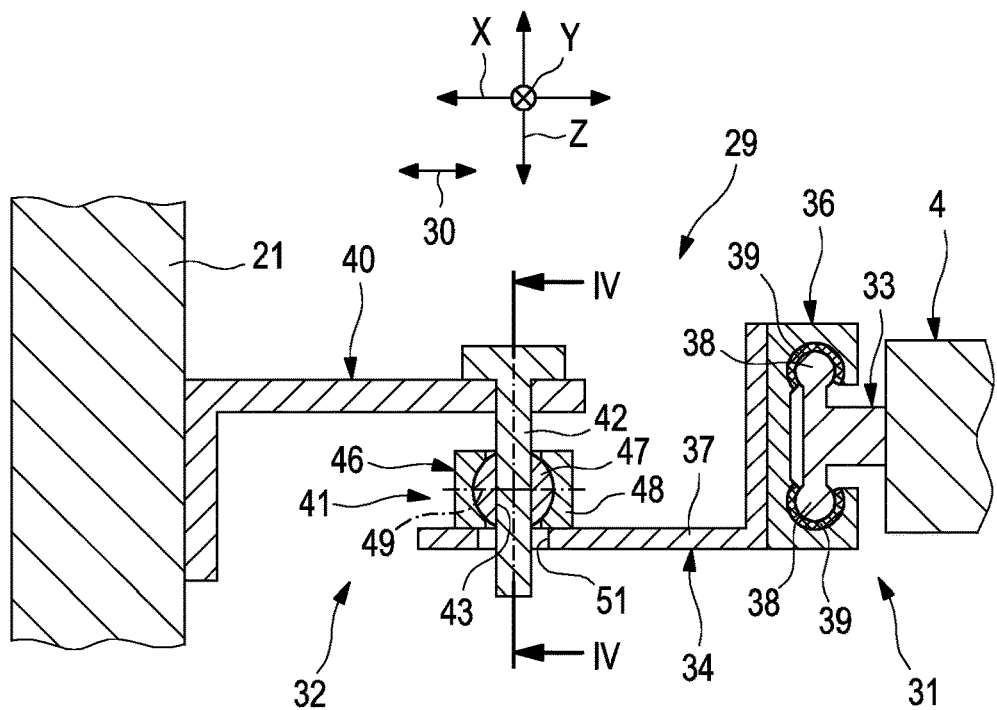
FIG. 3 shows a highly simplified sectional view of the vehicle in the area of a coupling device.
Figure 4:
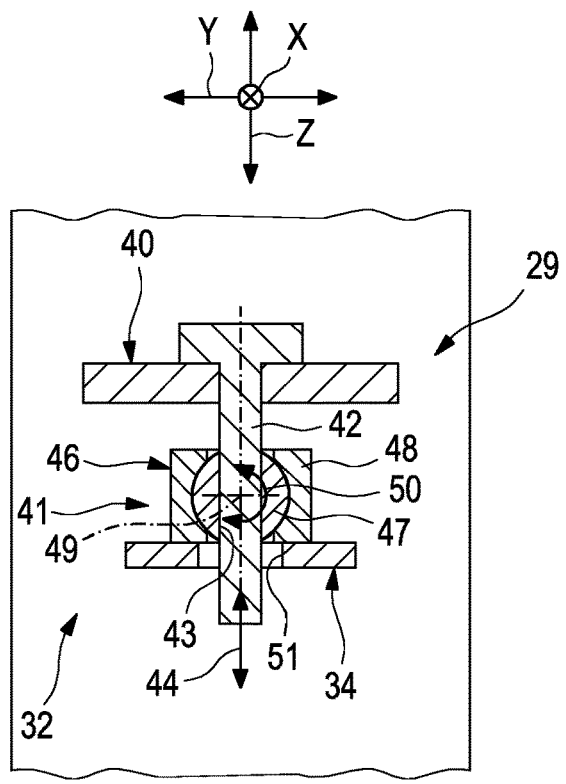
FIG. 4 shows a further sectional view of the vehicle in the area of the coupling device according to sectional lines IV in FIG. 3.

With reference to FIGS. 3 and 4, the coupling device 29 will be discussed in more detail below.

According to FIGS. 3 and 4, the coupling device 29 generally has a stationary area 31 and a mobile area 32, which are coupled to one another for the tensile and compressive force transmission 30. The stationary area 31 is fastened to the upper frame 4. The mobile area 32 is fastened to the steering rod 21. The mobile area 32 comprising the steering rod 21 can thus be pivoted about the steering axis 24, whereby the mobile area 32 moves relative to the upper frame 4 in the vehicle transverse axis Y.

In the preferred embodiment of the coupling device 29 introduced here, the coupling device 29 has a guide rail 33, which is fastened to the upper frame 3, and an adjustable frame part 34, which is guided on the guide rail 33 in the vehicle transverse axis Y. The frame part 34 can thus be adjusted along the guide rail 33, thus substantially in the vehicle transverse axis Y, and is also coupled to the guide rail 33 for the tensile and compressive force transmission 30. In the preferred example shown here, the guide rail 33 is designed as straight, linear guide rail 33, so that it extends parallel to the vehicle transverse axis Y. In the middle position of the steering rod 21 shown in FIG. 2, the coupling device 29 is largely covered. In particular only the guide rail 33 can be seen, because the frame part 34 is located behind the steering rod 21 in the viewing direction. The adjustment path of the frame part 34 along the guide rail 33 can be limited by lateral end stops 35, which are arranged on the guide rail 33 or on the bottom frame 4, respectively, in the area of the longitudinal ends of the guide rail 33. Advantageously, the frame part 34 is equipped with at least one carriage 36, which is mounted on the guide rail 33 so as to be adjustable. For example, the carriage 36 is a separate component, which is optimally adapted to the guide rail 33. The frame part 34 then advantageously has a mounting body 37, to which the carriage 36 is fastened. Suitable fastening means are not illustrated here. The respective carriage 36 can on principle also be integrally molded on the remaining frame part 34. So that steering movements can also be performed with particularly low friction, when more or less high tensile or compressive forces are transmitted simultaneously, the carriage 36 can be dimensioned to be correspondingly large in the rail longitudinal direction, thus here in the vehicle transverse direction Y, to attain a wider support. It is also conceivable to arrange two carriages 36 next to one another in the rail longitudinal direction with or without a distance to attain a particularly wide support.

In the shown example, the guide rail 33, which is also fastened to the upper frame 4 in a suitable manner, has two guide contours 38, for example in each case comprising an arcuate profile, which extends across more than 180°. For each guide contour 38, the respective carriage 36 has at least one guide mount 39, which is formed complementary to the guide contour 38 and by means of which the carriage 36 is mounted on the respective guide contour 38, so that it is guided with little friction along the guide contour 38. The carriage 36 further cooperates with the guide rail 33 in such a way that it can be adjusted along the guide rail 33, while it is fixedly connected to the guide rail 33 in the transverse direction thereto. In the example, the guide rail 33 is oriented parallel to the vehicle transverse axis Y, so that the carriage 36 can be adjusted along the guide rail 33 in the vehicle transverse axis Y. In contrast, the carriage 36 is fixedly connected to the guide rail 33 in the vehicle longitudinal axis X and in the vehicle vertical axis Z, which is substantially realized here by means of an intensive positive connection.

The coupling device 29 introduced here also has a handlebar part 40, which is fastened to the steering rod 21, as well as a compensating joint 41. The compensating joint 41 connects the handlebar part 40 to the frame part 34 in an articulated manner. In the example, the compensating joint 41 has a guide pin 42 as well as a pin receiver 43. In the pin receiver 43, the guide pin 42 is mounted so as to be adjustable in the vehicle vertical axis Z according to a double arrow 44. In the shown example, the guide pin 42 is fastened to the handlebar part 40, while the pin receiver 43 is fastened to the frame part 34. On principle, a reverse design is conceivable as well. The guide pin 42 can be screwed to the handlebar part 40 or can be fixedly connected thereto in another suitable way. The same applies for the pin receiver 43 or for a component, which includes the pin receiver 43, respectively. Adventitiously, guide pins 42 and pin receiver 43 are arranged in such a way that the guide pin 42 can be inserted into the pin receiver 43 from the top or that the pin receiver 43 can be attached to the guide pin 42 from the top, respectively. In this way, the steering rod 21 can be disassembled and assembled particularly easily for an improved access to the vehicle seat 6. This is so, because according to FIGS. 1 and 2, provision is advantageously made for the steering rod 21 to be capable of being removably inserted into a rod receiver 45, namely also from the top again. The rod receiver 45 is thereby attached to the handlebar mount 43.

Returning to FIGS. 3 and 4, the compensating joint 41 according to the preferred embodiment shown here, advantageously has a mount 46, which, in turn, has a mounting body 47 and a mounting housing 48. The mounting body 47 is mounted in the mounting housing 48 so as to be pivotable about a mounting axis 49, which runs parallel to the vehicle longitudinal axis X. A corresponding pivotable adjustability is suggested in FIG. 4 by means of a double arrow 50. The mounting body 47 forms or includes the pin receiver 43, respectively. The mounting housing 48 is fastened to the frame part 34 here. Corresponding fastening means, such as, for example, screws, are not illustrated here. In the shown example, the mounting body 47 is designed as spherical body, so that it has a spherical outer contour. In the alternative, the mounting body 47 could also be designed as cylinder body comprising a circular cylindrical outer contour. The longitudinal central axis of this cylindrical mounting body 47 then extends concentrically to the mounting axis 49.

In the area of the compensating joint 41, the frame part 34 has a passage opening 51, through which the guide pin 42 protrudes. With regard to its cross section or diameter, the passage opening 51 is thereby dimensioned larger than the guide pin 42, whereby collisions between the guide pin 42 and the frame part 34 can be avoided, when the guide pin 42 pivots about the mounting axis 49 in the mount 46 in response to the steering by pivoting the steering rod 41 about the steering axis 24. It is clear that other embodiments are on principle also conceivable for the coupling device 29. However, the embodiment introduced here is characterized by a safe mode of operation with a cost-efficient setup.

The invention claimed is:

1. A dynamically balancing vehicle, comprising:
a chassis including a lower frame and an upper frame, the upper frame fixedly connected to the lower frame and arranged above the lower frame in relation to a vehicle vertical axis,
a vehicle seat, which is borne by the upper frame, for a vehicle driver,
at least two wheels for supporting the lower frame on an underlying surface, the at least two wheels mounted on the lower frame so as to be rotatable about a common wheel axis of rotation that runs parallel to a vehicle transverse axis,
a drive device coupled to the at least two wheels for dynamically balancing the vehicle and for driving, braking and steering the vehicle,
a steering device for generating steering commands and including a steering rod that can be operated by the vehicle driver, wherein the steering rod is mounted via a handlebar mount on the lower frame so as to be pivotable about a steering axis that runs parallel to a vehicle longitudinal axis, and
a coupling device that connects the upper frame to the steering rod for transmission of tensile and compressive forces in the vehicle longitudinal axis and permits relative movements between the steering rod and the upper frame in the vehicle transverse axis.

2. The vehicle according to claim 1, wherein:
the coupling device has a stationary area and a mobile area coupled to one another for transmission of tensile and compressive forces,
the stationary area is fastened to the upper frame, and
the mobile area is fastened to the steering rod and pivots with the steering rod about the steering axis so as to move relative to the upper frame in the vehicle transverse axis.

3. The vehicle according to claim 1, wherein the coupling device includes a guide rail secured to the upper frame and an adjustable frame part and wherein the adjustable frame part is guided on the guide rail in the vehicle transverse axis and is coupled to the guide rail for the transmission of tensile and compressive forces.

4. The vehicle according to claim 3, wherein:
the frame part has at least one carriage or is fastened to at least one carriage, and
the at least one carriage is mounted on the guide rail so as to be adjustable.

5. The vehicle according to claim 4, wherein:
the guide rail has at least one guide contour, and
the at least one carriage has at least one guide mount, and wherein the at least one carriage is mounted on the at least one guide contour via the at least one guide mount so as to be adjustable.

6. The vehicle according to claim 4, wherein the at least one carriage cooperates with the guide rail such that the at least one carriage is adjustable along the guide rail and is fixedly connected to the guide rail in a transverse direction thereto.

7. The vehicle according to claim 3, wherein the guide rail is structured and arranged as a straight, linear guide rail.

8. The vehicle according to claim 3, wherein the coupling device further includes a handlebar part fastened to the steering rod and a compensating joint, and wherein the handlebar part and the frame part are connected to one another in an articulated manner via the compensating joint.

9. The vehicle according to claim 8, wherein:
the compensating joint has a guide pin and a pin receiver, the guide pin mounted in the pin receiver so as to be adjustable in the vehicle vertical axis,
the guide pin is fastened to one of the handlebar part and the frame part, and the pin receiver is provided on the other one of the handlebar part and the frame part.

10. The vehicle according to claim 9, wherein one of:
the guide pin is fastened to the handlebar part and is inserted into a rod receiver arranged on the handlebar mount so as to be removable in the vehicle vertical axis, and
the pin receiver is fastened to the handlebar part and is attached to the guide pin so as to be removable in the vehicle vertical axis.

11. The vehicle according to claim 9, wherein:
the compensating joint has a mount including a mounting body mounted in a mounting housing so as to be pivotable about a mounting axis that runs parallel to the vehicle longitudinal axis,
the mounting body includes or forms the pin receiver, and
the mounting housing is fastened to the handlebar part or to the frame part.

12. The vehicle according to claim 11, wherein the mounting body has a circular cylindrical outer contour or a spherical outer contour.

13. The vehicle according to one of claim 1, wherein the steering rod is inserted into a rod receiver arranged on the handlebar mount, so as to be removable in the vehicle vertical axis.

14. The vehicle according to claim 1, further comprising:
an inclination sensor system for determining an angle of inclination of the vehicle longitudinal axis with respect to a horizontal plane extending perpendicularly to a gravitational direction, and
a control device coupled to the steering device and to the inclination sensor system, wherein the control device generates drive commands and brake commands as a function of the angle of inclination and controls the drive device as a function of the steering commands, the drive commands and the brake commands.

15. The vehicle according to claim 1, wherein the drive device comprises a respective electric motor provided for each of the at least two wheels.

16. A dynamically balancing vehicle, comprising:
a chassis including a lower frame and an upper frame the upper frame fixedly connected to the lower frame and arranged above the lower frame in relation to a vehicle vertical axis;

a vehicle seat borne by the upper frame;
at least two wheels for supporting the lower frame on an underlying surface, the at least two wheels mounted on the lower frame so as to be rotatable about a common wheel axis of rotation that runs parallel to a vehicle transverse axis;
a respective drive device coupled to each of the at least two wheels for dynamic balancing and driving, braking and steering;
a steering device for generating steering commands, the steering device including a steering rod mounted via a handlebar mount on the lower frame so as to be pivotable about a steering axis that runs parallel to a vehicle longitudinal axis; and
a coupling device structured and arranged to connect the upper frame to the steering rod for transmission of tensile and compressive forces in the vehicle longitudinal axis and to permit relative movements between the steering rod and the upper frame in the vehicle transverse axis.

17. The vehicle according to claim 16, wherein the coupling device has a stationary area and a mobile area coupled to one another for the transmission of tensile and compressive forces.

18. The vehicle according to claim 16, wherein the coupling device includes a guide rail and an adjustable frame part, and wherein the guide rail is secured to the upper frame part and the adjustable frame part is guided on the guide rail in the vehicle transverse axis.

19. The vehicle according to claim 18, wherein the guide rail is a straight, linear guide rail.

20. The vehicle according to claim 18, wherein the coupling device further includes a handlebar part secured to the steering rod and a compensating joint, and wherein the handlebar part and the frame part are connected to one another in an articulated manner via the compensating joint.

* * * * *